UNITED STATES PATENT OFFICE.

GEORGE HILLARD BENJAMIN, OF NEW YORK, N. Y.

FERTILIZER AND PROCESS OF MAKING THE SAME.

1,105,607. Specification of Letters Patent. Patented Aug. 4, 1914.

No Drawing. Application filed May 23, 1912. Serial No. 699,326.

*To all whom it may concern:*

Be it known that I, GEORGE HILLARD BENJAMIN, a citizen of the United States, residing at New York city, in the county and State of New York, have invented certain new and useful Improvements in Fertilizers and Processes of Making the Same, of which the following is a specification.

My invention consists in a process for treating the residual waste product obtained after subjecting ligno-cellulose to the action of a hydrolyzing agent, as now practised in the production of methyl alcohol from wood, to convert it into a fertilizer.

The hydrolyzing processes which may be employed for converting ligno-cellulose into glucose are: (1) Extensive and long boiling of the cellulose with water. (2) Subjecting the cellulose to the action of an enzym. (3) Subjecting the cellulose to the action of hydrolyzing chemicals. The residual waste product obtained, will of course, depend upon the nature of the hydrolyzing process employed.

As hydrolyzing by means of long boiling is commercially impracticable, I confine my process to the treatment of the waste products obtained by fermentation or chemical treatment, and in order that the physical and chemical characteristics of such waste products will be understood, I will first describe the general and special treatment to which the wood is subjected in hydrolyzing.

Wood of the kind commercially employed, and in the form of fine chippings, sawdust, shavings, etc., consists approximately of

| | |
|---|---|
| Organic substances | 85–89% |
| Ash | 03–07% |
| Water | 10–14% |

The organic substances consist of

| | |
|---|---|
| Lignin | 21 –39% |
| Cellulose | 45 –63% |
| Resin | 0.4 – 4.0% |
| Aqueous extract | 1.26– 2.88% |

The average contents of the ash is

| | |
|---|---|
| $H_2SO_4$ | 0.1 |
| $H_3PO_4$ | 0.2 |
| $SiO_2$ | 0.2 |
| $K_2CO_3$ | 0.4 |
| $Na_2CO_3$ | 0.2 |
| $CaCO_3$ | 1.3 |
| $MgCO_3$ | 0.2 |

The foregoing table shows the percentages in 1000 parts of wood with the total ash equal to about two to three parts.

The ligno-cellulose ($C_{12}H_{18}O_9$) which forms 30% of the organic substances, consists of

| | |
|---|---|
| Carbon | 46 –47% |
| Hydrogen | 6.5– 5.8% |
| Oxygen | 47.9–47.2% |

The first step in the hydrolyzing process is to separate the two series of organic substances, i. e., the sugars from the resins and proteids. To accomplish this their physical properties must be taken into consideration. Etheric oils, resins, etc., as is well known, have a very low boiling point, whereas cellulose and its derivatives have a high boiling point. To effect separation, the ligno-cellulose in whatever form, is put into a container and steam introduced at a pressure of about five atmospheres, and maintained for about thirty-five minutes. At the end of this time the steam is drawn off, carrying with it the volatile substances, which may be condensed, leaving the cellular structure of the woody fiber in a separated or loosened condition. With certain woods this process may have to be repeated several times, to bring the woody fiber into the best physical condition to effect hydrolyzation.

*Hydrolyzation by fermentation.* — The woody fiber derived from the treatment above described, is now transferred to a vat, preferably shallow in depth and of considerable width and length, and water introduced until the layer of water is about four inches in depth. The water is preferably hot, and is maintained at a temperature of from 15 to 40° centigrade. Simultaneously with the introduction of the water, any suitable enzym is introduced. In practice 100 grams of enzym will hydrolyze 1000 kilos of wood fiber. The best action of the enzym is obtained at from 28 to 33° centigrade. Care should be taken in carrying out this process, to prevent the formation of an acid. The reaction will take from 12 to 24 hours, according to the condition of the material and the temperatures.

After the conversion of the cellulose, contained in the woody fiber, into glucose, the fluid portion of the body is drawn off, and if desired, subjected to the action of an enzym and distillation to convert the glucose into alcohol. The residual semi-solid product is then mixed with the residual liquid product from the distillation process, pressed, and finally subjected to a dehydrating process, preferably dehydrated hot dry air, to form a dry final product.

*Hydrolyzation by chemical action.*—The woody fiber derived from the initial treatment as previously described, may be subjected to the action of an inorganic acid, as for instance, sulfuric acid ($H_2SO_4$), hydrochloric acid (HCl) or preferably phosphoric acid ($H_3PO_4$), the reactions being aided by heat. The treatment with sulfuric acid and hydrochloric acid is fully described in U. S. Letters Patents granted to Malcolm F. Ewen and George H. Tomlinson, No. 763,472 dated June 28th, 1904, and No. 938,308 dated October 26, 1909.

The preferred treatment with phosphoric acid I believe to be original with me, and this treatment I will describe, although I make no claim for it in this application.

The woody fiber derived from the initial treatment, is introduced into a container and steam at 100 lbs. pressure turned on for about fifteen minutes to separate any volatile products which have remained from the initial treatment. The steam is then cut off and the container connected to a vacuum pump and the pressure reduced to about twenty inches. At such time, a solution of phosphoric acid ($H_3PO_4$) is introduced. The strength of the solution will depend upon the amount of cellulose present. In ordinary conditions of practice, for 1000 lbs. of sawdust in its original state, 15 lbs. of phosphoric acid will be required. The amount of water used in the phosphoric solution also depends upon the condition of the mass treated. I prefer to use as little water as possible. After the solution of phosphoric acid is added, the temperature is raised to approximately 350° Fahrenheit. The time required to effect hydrolyzation is generally from 20 minutes to three hours, depending upon the character of the product treated. After the conversion of the cellulose into glucose which is according to the following reaction, to wit:

$$C_6H_{10}O_5 + H_3PO_4 = C_6H_{12}O_6 + HPO_3,$$

the contents of the container are ejected and left standing for an hour, and the liquid and semi-solid masses separated—the liquid may be fermented and distilled for the production of alcohol, and the semi-solid mass pressed, after which the residual liquid product of the distillation process is added and the entire mass dried by dehydration or otherwise to form a dry final product. The second step in the hydrolyzing process consists in introducing sufficient lime to neutralize the hydrolyzing bodies thereby producing, when hydrolyzation is effected with sulfuric acid, calcium sulfate, and with phosphoric acid, calcium phosphate, probably in the mono- or di-calcic form, both of which are soluble.

Having thus described the production of the product which is to be converted into a fertilizer, I will now describe the treatment of such product to form the fertilizer.

*Treatment of the product produced by fermentation.*—The dry product may conveniently be divided into three parts of equal weight or of different weight, in accordance with the percentage of the materials derived from the separate parts which it is desired to incorporate in the fertilizer. One part is incinerated to form ash. A second part is introduced into a retort and subjected to the required temperature to convert the ligno-cellulose into amorphous carbon and ash. A third part is mixed with such an amount of ammonia compounds, phosphates and nitrates as may be required to form, in connection with the other materials obtained from the first and second parts, the fertilizer desired. The three parts are then mixed and sifted.

*Treatment of the product produced by hydrolyzing with sulfuric acid.*—The dry product may be divided into three parts, equal in weight or otherwise, as desired. One of these parts is mixed with any suitable binder and pressed to form briquets. In practice I find that such a binder may consist of wet sulfate of lime. A second part is introduced into a retort and subjected to the required temperature to convert the ligno-cellulose into amorphous carbon and ash. A third part is mixed with the required quantity of ammonia compounds, phosphates, and nitrates, and the three parts mixed, ground, and sifted. To the product thus obtained the sulfate of lime which was formed in neutralizing the sulfuric acid in the hydrolyzing process and which has been dried by dehydration, may be added.

*Treatment of the product produced by hydrolyzing with phosphoric acid.*—The dry product receives the same treatment as described for treatment of the product produced by fermentation, with the exception that a smaller percentage of phosphoric acid is added and required.

The three steps described in each example, are necessary for the following reasons:

*The incinerating step.*—The object of this step is to concentrate the mass by destroying the organic matter. The remaining substances will consist of sulfates, phosphates, carbonates, silicates, and chlorids.

*The carbonizing step.*—The object of this step is to effect the conversion of the ligno-cellulose into amorphous carbon, the amorphous carbon and ash forming a body which is in a condition to be readily absorbed by the plant, and further, acts to prevent decay of the woody fiber of the third part and to promote disintegration. Disintegration, as is well understood, is differentiated from decay, in that disintegration enriches the organic substances, while decay sets free gases which impoverish the organic substances.

*The enriching step.*—The object of this step is to add such amounts of ammonia, phosphates and nitrates as are required to produce the particular fertilizer desired.

In each case the fertilizer produced consists of: (1) A highly porous carrying body, *i. e.*, the dry ligno-cellulose final product. The porous nature of this body acts to open the earth and allow access of water and thus promotes chemical evolution of gases and the like. (2) A humus-like substance (derived from the action of the carbonates of the ash upon the ligno-cellulose itself). (3) Balanced alkalis and acids. As has been stated, the calcium sulfate or calcium phosphate obtained in the treatment of the ligno-cellulose by sulfuric acid or phosphoric acid, may be added to the fertilizer, and ordinary hydrate of lime may also be added, where it is found that there is a tendency of the fertilizer to become acid. I do not limit myself in any wise to the character of the soluble ammonia compounds, nitrates or phosphates which may be added.

In carrying my improved process into effect, I may prefer to briquet the first part, and then burn the briquets to form ash and also incidentally, to produce the heat to carbonize the second part. Instead of compressing the first part into briquets and then burning, I may introduce the dehydrated product, together with a certain percentage of sulfate of lime and dry lime, into a suction gas producer and use the gas for power or heating purposes and the ash as one part of the fertilizer.

I have not described the proportions of the different ingredients which may be combined to form the fertilizer as this is clearly a matter of determination, depending upon the character of the fertilizer required.

I have described the first and second steps as carried on separately. These two steps may be combined, that is to say, the incinerating and carbonizing steps may be combined, and in the case where the phosphates or nitrates are obtained from certain grades of minerals, all three steps may be combined with the exception that a certain amount of the initial waste product in a dry state may be mixed with the other bodies to impart the porous character desired. Where the hydrolyzing of the ligno-cellulose is effected by the addition of phosphoric acid, and such phosphoric acid neutralized by the introduction of lime, calcium phosphate will be produced which will form a part of or may be incorporated with the initial waste product, in which case the amount of phosphates which would normally be added to the third part, would be materially decreased.

Having thus described my invention, I claim:

1. The herein described process of making a fertilizer from ligno-cellulose, which consists in dividing a mass of ligno-cellulose into separate parts, burning one part to obtain an ash, carbonizing a second part to obtain amorphous carbon and ash, mixing with another part such chemical bodies as are nutritive to plant life, and finally mixing the separate parts.

2. The herein described process of making a fertilizer from ligno-cellulose, which consists in dividing a mass of ligno-cellulose into separate parts, burning one part to obtain an ash, carbonizing a second part to obtain amorphous carbon and ash, mixing with another part ammonia, nitrates and phosphates, and finally mixing the separate parts.

3. The herein described process of making a fertilizer from ligno-cellulose, which comprises dividing a mass of ligno-cellulose into separate parts, carbonizing one part to obtain amorphous carbon and ash, mixing with another part chemical bodies nutritive to plant life, and finally mixing the separate parts.

4. The herein described process of making a fertilizer from a mass consisting of ligno-cellulose and sulfate of lime, which consists in dividing a mass of such body into separate parts, burning one part to destroy the organic matters, carbonizing a second part to obtain amorphous carbon, ash and a calcium compound, mixing with another part chemical bodies nutritive to plant life, and finally mixing the separate parts.

5. The herein described process of making a fertilizer from ligno-cellulose which has been subjected to the action of a hydrolyzing acid, which consists in dividing a mass of such treated ligno-cellulose into separate parts, burning one part to obtain an ash, carbonizing a second part to obtain amorphous carbon and ash, mixing with another part chemical bodies nutritive to plant life, and finally mixing the separate parts.

6. A fertilizer comprising inorganic ash, amorphous carbon, ligno-cellulose, ammonia compounds, phosphates and nitrates.

7. A fertilizer consisting of inorganic ash, a calcium salt, amorphous carbon, ligno-cellulose, ammonia compounds, phosphates and nitrates.

8. A fertilizer consisting of a highly porous carrying body, an inorganic ash, amorphous carbon, and chemical bodies nutritive to plant life.

9. A fertilizer consisting of a highly porous carrying body, an inorganic ash, amorphous carbon, and ammonia compounds, phosphates and nitrates.

10. A fertilizer consisting of a carrying body formed from dry ligno-cellulose, an inorganic ash, amorphous carbon, and ammonia compounds, phosphates and nitrates.

11. A fertilizer consisting of a carrying body formed from comminuted, dry ligno-cellulose, an inorganic ash, amorphous carbon, and balanced acids and alkalis nutritive to plant life.

12. A fertilizer consisting of a porous carrying body, an inorganic ash, amorphous carbon, and a calcium salt.

In testimony whereof, I affix my signature, in the presence of two witnesses.

GEORGE HILLARD BENJAMIN.

Witnesses:
HELEN E. KOELSCH,
ELI WEILL.